United States Patent Office 3,320,292
Patented May 16, 1967

3,320,292
PREPARATION OF SULFONATED FATTY ACID ESTER SURFACE-ACTIVE AGENTS
Arno Cahn, Pearl River, N.Y., and Henry Lemaire, Leonia, Vincent Lamberti, Teaneck, and Robert A. Haass, Ridgewood, N.J., assignors to Lever Brothers Company, New York, N.Y., a corporation of Maine
No Drawing. Filed Sept. 5, 1963, Ser. No. 306,718
6 Claims. (Cl. 260—400)

The present invention relates to the preparation of surface-active agents. More particularly, it relates to a process for preparing surface-active agents of the general formula $RCOOR'SO_3M$, where R is a monovalent aliphatic hydrocarbon radical having from 7 to 19 carbon atoms, R' is selected from the group consisting of divalent aliphatic hydrocarbon radicals containing 2 to 4 carbon atoms and alkylaryl radicals containing from 6–8 carbon atoms and M is an alkali metal cation, particularly sodium, potassium and lithium, the surface-active agents being prepared by the direct esterification of an alcohol of the formula $HOR'SO_3M$ with an organic acid of the formula $RCOOH$.

The conventional direct esterification method suffers from certain disadvantages. An important disadvantage is that the reaction will not go to completion, yields normally being less than 90% of the theoretical. Further, the high temperatures and long reaction time required are uneconomical and can cause discoloration of the product. While it is known that various acids and acidic salts catalyze the direct esterification reaction, these have proved to be undesirable because of the severe corrosion problem introduced when using these catalysts.

It has now been found that the above reaction may be carried out more easily, quickly, and in higher yields, by heating the reactants in the presence of zinc oxide or zinc soaps, i.e., soaps which are zinc salts of aliphatic acids, for example, those formed by the reaction of zinc oxide with acids of the formula RCOOH described above. The disadvantages of the prior art methods are thereby overcome or reduced.

In carrying out this reaction, the organic acids which are suitable for the manufacture of surface-active agents may be used. In general, these are the acids of aliphatic hydrocarbons having from 8 to 20 carbon atoms. Such acids include the unsubstituted, saturated or unsaturated, straight-chain, fatty acids, such as lauric acid, myristic acid, palmitic acid, stearic acid, and oleic acid, acids derived from bone grease (a mixture of $C_{16-18}$ fatty acids), acids derived from palm kernel oil (a mixture of $C_{8-18}$ fatty acids), acids derived from coconut oil (a mixture of $C_{8-18}$ fatty acids), and acids derived from tallow (a mixture of saturated and unsaturated $C_{16-18}$ fatty acids). Synthetic acids such as those derived from the Oxo and Koch processes may also be used. Fatty acids of the foregoing type may be used pure or may be employed as mixtures.

As compounds of the formula $HOR'SO_3M$ (hereinafter referred to as the second reactant) it is preferred to use a compound in which R' is a divalent hydrocarbon radical containing 2 to 4 carbon atoms, particularly, ethylene, methylethylene, dimethylethylene, propylene or butylene. R' may also be an aryl or alkylaryl group containing from 6 to 8 carbon atoms. M is preferably an alkali metal especially sodium or potassium. The preferred second reactant may be prepared by the reaction of an epoxide, for example ethylene oxide, propylene oxide or butylene oxide, with sodium bisulfite. Examples of compounds suitable for use as the second reactant are sodium isethionate, potassium methyl isethionate, sodium dimethyl isethionate and sodium 3-hydroxy-propane-sulfonate.

The reaction is carried out by using an excess of the acid reactant, for example at least about 1.2 moles of the acid per mole of the second reactant. An excess of the acid reactant assists in maintaining the product in liquid form during the reaction, and also helps to reduce formation of foam. Amounts of acid in excess of about 2 moles per mole may be used in the practice of this invention.

The products of the reaction of this invention are generally used as detergents, such as in the manufacture of detergent tablets or the manufacture of detergent hand soaps in bar form. The products of reaction may be used without further treatment, or may be freed of unreacted acids before being used in finished detergent products. The excess acid may be wholly or partially neutralized by the addition of bases or basic salts such as the alkali metal carbonates or hydroxides. In some instances it may be desirable to remove the excess acid reactant by distillation. In other instances it may be advantageous to replace the lower molecular weight excess fatty acids by a higher molecular weight fatty acid (e.g., stearic) by distillation of the lower molecular weight acid in the presence of the higher molecular weight acid.

According to the present invention, the yields obtained in the above reaction are improved significantly by providing for the presence of zinc oxide, zinc soaps or mixtures thereof in the reaction mixture. The amount of zinc compound is not important, and widely varying amounts may be satisfactorily used. In general, about 0.05% to about 5% (calculated as ZnO) of the zinc compound is provided, based on the combined weight of the hydroxy sulfonate, fatty acid and zinc compound, but greater or lesser amounts may be used. In a preferred embodiment of this invention, the zinc compounds are present in an amount between about 0.1% and about 1.0% (calculated as ZnO). In a particularly preferred embodiment the amount of zinc compound used is between about 0.1% and about 0.2%. It has been observed that larger amounts of zinc compound may result in a product which imparts a gritty or sandy feel to detergent-containing bars made therefrom.

Suitable zinc soaps for use in the present invention are formed from the fatty acids having from 8 to 20 carbon atoms and being generally of the same description as the fatty acids which may be used as the fatty acid reaction. It is convenient, but not necessary, that the fatty acid portion of the zinc soap added be the same as the fatty acid reactant. Because of the interchange reactions occurring in the reaction mass, it is probable that the zinc, whether added as the oxide or as a soap, is present predominantly as the zinc soap of the fatty acid reactant.

The reaction should be carried out with stirring in order to assist in homogenization of the reaction mixture, but stirring of much less vigor is necessary when the above-mentioned zinc compounds are present in the reaction mixture.

Any water present in the reaction mass introduced as water associated with a reactant or catalyst, and water resulting as a by-product of the reaction should be removed. Vaporization of this water under reduced pressure may be employed if desired, particularly, to remove such water during the reaction, but reduced pressure is not an essential feature of the process. A small portion of the acid reactant may be distilled off with the water, and allowance should be made for this when calculating the amount of the acid reactant to be used.

The reaction is carried out at a temperature of about 200° to about 240° C. Because discoloration of the product tends to occur at these temperatures, although to a lesser extent than at higher temperatures, it is preferred that an inert gas such as nitrogen or carbon dioxide be bubbled through the reaction vessel at a rate sufficient to maintain an inert atmosphere. It has been found that providing a non-oxidizing atmosphere in the reaction vessel reduces color formation in the products to the greatest possible extent. In some cases it may also be desirable to bubble the inert gas through the reactants before they are introduced into the reaction vessel in order to deoxygenate them. A particularly white product is obtained by using nitrogen which contains less than about 100 p.p.m. of oxygen, or preferably less than about 10 p.p.m of oxygen.

The process of the present invention may be carried out as a batch process, i.e., with the reactants and the zinc compound present initially in the reaction vessel, or it may be modified to form a continuous or semi-continuous process.

The invention is illustrated by the following examples:

*Example 1*

A mixture of 235 grams (1.1 moles) of coconut oil fatty acids, 118 grams (0.8 mole) of sodium isethionate, and 21 ml. of water (to simulate a slurry of isethionate typical of those encountered in commercial operations) was charged in a 1 liter reaction vessel and stirred. The vapor space of the reactor was provided with a nitrogen sweep in order to exclude air during the reaction, and one half liter per minute of prepurified nitrogen, containing a minimum of 99.996% nitrogen and an average oxygen content of 8 p.p.m. was bubbled through the reaction mixture. Nitrogen leaving the reaction vessel passed first through a water condenser and second through a dry ice condenser to remove vapors generated by the reaction.

To provide a basis for comparison, the above reaction was carried out without the presence of a zinc compound. The reactor was heated in an oil bath to a temperature of about 245° C., by which time all the initial water had been evaporated. This temperature was maintained until the water was no longer evolved. The cessation of water evolution served as a convenient, though approximate, indication of the end of the reaction.

After cessation of water evolution, heating and stirring were continued for an additional ten minutes. If no additional water was collected, this time interval was not included in the reaction time reported, the reaction time reported being the interval from the end of evolution of the initial water until water evolution ceased.

A sample of the melt was taken at this point. Sixty-five grams of Emersol 134 (a mixture of 45% stearic acid and 55% palmitic acid) were added, and the excess coconut fatty acids distilled off at a pressure of approximately 2–4 mm. Hg. The weight of the residue was determined, and a sample taken for a Hyamine titration (described in "ASTM Standards, Part 10," 1961 pp. 1099–1101, using di-isobutylphenoxyethoxyethyl, dimethyl benzyl ammonium chloride dihydrate). From this data the amount of isethionate ester produced was calculated. The percent of theoretical yield was determined on the basis of the theoretically possible 0.8 mole. The results of 4 control runs are set forth on Table I.

TABLE I.—REACTION YIELD WITHOUT THE PRESENCE OF ZINC

| Time (min.) | Temp. (° C.) | Conversion, percent |
|---|---|---|
| 120 | 240–246 | 89 |
| 100 | 241–248 | 89 |
| 120 | 244–254 | 88 |
| 130 | 242–251 | 87 |

*Example 2*

A second group of control runs were made at lower temperatures following otherwise the procedure of Example 1. The reaction is very much slower in the absence of catalyst, as illustrated by the data in Table II. The temperature of about 230° C., and the time permitted for reaction, about 90 minutes, in these control runs are typical of the reaction conditions prevailing when the reaction is carried out in the presence of zinc compounds in accordance with the present invention. Accordingly, the yields set forth in Table II may be directly compared with the yields given in subsequent examples to show the effect of the zinc compound.

TABLE II.—REACTION YIELD WITHOUT THE PRESENCE OF ZINC

| Time (min.) | Temp. (° C.) | Conversion, percent |
|---|---|---|
| 90 | 231–234 | 31 |
| 90 | 229–232 | 32 |

In the example set forth in Table II the reaction was terminated after 90 minutes rather than permitting it to continue until water evolution had ceased. However, at the end of the 90 minute reaction period it was observed, as reflected by the water evolution rate, that the reaction had substantially ceased.

*Example 3*

To illustrate the effect of zinc oxide on the reaction, the procedure outlined in Example 1 was repeated except that zinc oxide was added along with the sodium isethionate and coconut fatty acid, and the reaction mixture was heated to a temperature of approximately 230° C. The results are set forth in Table III.

TABLE III.—EFFECT OF ZINC OXIDE ON REACTION YIELDS

| Weight Percent Zinc Oxide | Reaction Time (min.) | Conversion, percent |
|---|---|---|
| 1 | 55 | 95 |
| 0.8 | 50 | 92 |
| 0.6 | 45 | 93 |
| 0.5 | 65 | 94 |
| 0.2 | 90 | 91 |
| 1 | 70 | [1] 90 |
| 1 | 50 | [2] 93 |

[1] This run was carried out at a temperature of about 220° C.
[2] This run was carried out with the agitator running at approximately ⅓ speed.

*Example 4*

In still another example a zinc soap was substituted for zinc oxide, following otherwise the experiment outlined in Example 3. The zinc soap used in this example was the salt of zinc and coconut fatty acid. The zinc may be added to the reaction mixture as the soap, or the soap may be formed in situ by simultaneously adding zinc sulfate and sodium soap. The zinc soap or mixture of zinc sulfate and sodium soap was added to the reaction vessel along with the other reactants. The results of this example are set forth in Table IV.

TABLE IV.—IMPROVEMENT IN YIELD RESULTING FROM ZINC SOAPS

| Compound | Weight percent | Time (min.) | Conversion, percent |
|---|---|---|---|
| Zinc soap | 6.1 | 45 | 93 |
| Do | 2.8 | 60 | 94 |
| Do | 1.9 | 70 | 91 |
| Do | 1.4 | 75 | 89 |
| Zinc sulfate | 2 | 60 | 97 |
| Sodium soap | 5.3 | | |
| Zinc sulfate | 1 | 60 | 92 |
| Sodium soap | 2.7 | | |
| Zinc sulfate | 1 | 70 | 96 |
| Sodium soap | 2.7 | | |
| Zinc sulfate | 0.5 | 90 | 91 |
| Sodium soap | 1.3 | | |
| Zinc sulfate | 0.5 | 80 | 89 |
| Sodium soap | 1.3 | | |

The compounds of the present invention may be used in conjunction with other compounds known to have an efficacious effect on this reaction.

In each of the foregoing examples, the reaction mixture containing 1.10 moles of coconut fatty acids and 0.8 mole of sodium isethionate provides an apparent ratio of 1.375 moles of acid per mole of isethionate. However, when zinc oxide is used, some fatty acid is consumed in reaction with it. Thus, in the presence of 1% zinc oxide, the effective ratio of fatty acids available for reaction to sodium isethionate is only 1.26 moles per mole. As the effective ratio is lowered below 1.20 moles per mole there is a marked decrease in the conversion of the isethionate to the fatty acid ester.

*Example 5*

A series of runs were made to illustrate the effect of the ratio of reactants. The procedure followed was essentially that set forth in Example 3. The sodium isethionate, coconut fatty acid and zinc oxide were charged into the reaction vessel and the reaction mixture was heated to a temperature of approximately 230° C. The results of this example are set forth in Table V.

TABLE V.—EFFECT OF VARIOUS RATIOS OF STARTING MATERIAL

| (A) Sodium Isethionate (moles) | (B) CNFA (moles) | Zinc Oxide, g. | Ratio, B/A | Cor. Ratio [1] | Min. | Conversation, percent |
|---|---|---|---|---|---|---|
| 0.80 | 1.22 | 3.99 | 1.52 | 1.40 | 50 | 94 |
| 0.80 | 1.16 | 3.86 | 1.45 | 1.33 | 45 | 92 |
| 0.80 | 1.10 | 3.74 | 1.375 | 1.26 | 50 | 94 |
| 0.83 | 1.075 | 3.74 | 1.30 | 1.18 | 60 | 90 |
| 0.83 | 1.04 | 3.74 | 1.25 | 1.14 | 90 | 89 |
| 0.88 | 0.97 | [2] 3.7 | 1.10 | 1.10 | 85 | 80 |
| 0.80 | 0.915 | 3.74 | 1.14 | 1.03 | 85 | 76 |

[1] Corrected for fatty acid zeacted with ZnO.
[2] Equivalent amount (23 gm.) of zinc soap used in place of oxide.

As mentioned above, it is especially preferred to use a zinc concentration between about 0.1% and about 0.2% by weight calculated as ZnO. When acylhydroxysulfonate esters which have been prepared by a direct esterification reaction in the presence of larger amounts of catalyst are used in the manufacture of detergent bars, the resulting bar tends to have a sandy texture. This sandy texture is believed to result from the difficulty of adequately blending these esters containing large amounts of the zinc compound with the other ingredients of the detergent bar. This problem may be overcome by suitably regulating the temperature of the mixing and extending the mixing time. Such precautions, however, create unnecessary problems in the commercially used equipment. Furthermore, extending the mixing time is undesirable since it is time-consuming and inefficient.

Surprisingly, it has been discovered that when lower amounts of zinc oxide or zinc soap are used, bars containing acyl isethionates may be obtained which are substantially free of the sandy texture.

Still another advantage of using lower levels of the zinc compound is that detergent bars containing acylhydroxysulfonates prepared by direct esterification using larger amounts of zinc compund tend to soften or become mushy more readily when exposed to water. These factors are illustrated by the following examples.

*Example 6*

A coconut-isethionate was prepared according to the following procedure:

Partially hydrogenated coconut fatty acid having an iodine value=5, 123 lbs. (0.58 lb.-mole), and zinc oxide powder were charged to a 50 gallon stainless-steel jacketed reactor equipped with an agitator, condenser, distillation receiver and vacuum pump. The reactor contents, after purging with nitrogen, were placed under a nitrogen blanket and heated to 150° C. Then, 86 lbs. of 72.7% active sodium isethionate solution (0.423 lb.-mole active) at 93° C. were added and the temperature gradually raised to 238° C. The water of solution distilled off first, followed by water of reaction and some co-distilled fatty acid. After one hour at 238° C., 35 lbs. of melted stearic acid were added and the reactor placed under a partial vacuum. A stream of nitrogen was continually sparged through the reactor contents while the vacuum was gradually increased to 29" Hg. During this time the excess coconut fatty acid distilled over and was collected. The vacuum was released using nitrogen and an additional 25 lbs. of stearic acid were then added. After partially cooling the product in the reactor to 177° C., the product was discharged and simultaneously cooled to about 121° C. in a water-cooled jacketed screw conveyor. When the zinc oxide catalyst level was 0.3% by weight of total initial solids content, the resulting white pasty mass contained 66.3% active sodium coconut isethionate. The balance was mainly stearic acid. This corresponded to a conversion of 94% of the starting sodium isethionate.

From the coconut-isethionate thus prepared, detergent-soap tablets were prepared by a mixing operation according to the following schedule.

Stearic acid and coconut-isethionate were heated to 110° C. and mixed in a sigma blade mixer for a period of 20 minutes. Soap, sodium dodecylbenzene sulfonate, water and titanium dioxide were added, and the mixture was blended for an additional 12 minutes at 110° C. The heating steam was then shut off, and the mixing continued for an additional 28 minutes while the batch slowly cooled. After the end of this period the bath was chilled and processed into bars using conventional soap milling and plodding equipment.

Tablets were made of samples of (A) coconut-isethionate prepared using 0.50% zinc oxide, (B) coconut-isethionate prepared using 0.3% zinc oxide, and (C) coconut-isethionate prepared using 0.1% zinc oxide. The detergent bar prepared from samples (A) and (B) had a sandy texture as determined by washing under running tap water at 75° F. The detergent bars prepared from sample (C) had a smooth texture.

*Example 7*

Tablets prepared from samples (B) and (C) of Example 6 were weighed and placed in a soap dish. A third group of tablets prepared from a coconut-isethionate synthesized in the presence of 1% ZnO was also weighed and used. Water at 24° C. was added until each bar was half submerged. After 16 hours exposure, the water was drained off, and the soft material (mush) on each removed by using gentle pressure of the thumb and fingers. After rinsing each tablet briefly in cold water, it was dried and reweighed, and the percent loss was determined. The tablets containing a sample of coconut-isethionate synthesized in the presence of 1% ZnO showed a 16.6% loss, sample (B) showed a 15.8% loss, and sample (C) showed a 12.2% loss by this test.

While the invention as set forth above is not to be limited by any theory, the following explanation may be helpful in understanding the nature of the new process.

The direct esterification of the hydroxyl group of hydroxy-sulfonates is known to be a difficult reaction. The presence of the sulfonate group is believed to adversely affect the reactivity of the hydroxyl group. Accordingly, where it is desired to carry out a direct esterification reaction, a reaction temperature of 240° to 250° C. and a relatively long reaction time have heretofore been required. Under these conditions, the yield of the reaction is significantly lower. Because of this, it has been the preferred practice in commerce to produce fatty acid esters of hydroxysulfonates by treating the hydroxy-sulfonate with an acid chloride. While the acid chloride route introduces additional steps and corrosive materials, the better yield obtained by the acid chloride route outweighs these disadvantages.

In the process of the present invention, the zinc oxide and zinc soaps are thought to act as catalysts. The catalytic activity of the zinc oxide and zinc soap with respect to the esterification of hydroxy-sulfonates is illustrated by comparing Example 1 with Examples 3 and 4, the data showing that the esterification may be carried out at a temperature which is about 15° C. lower, i.e., about 230° C., and that the reaction is substantially complete in a period of about 1 to 1½ hours, while reaction times of approximately 2 hours are required when no catalyst is used. In the absence of a catalyst, the resulting yields, even at higher temperatures are not as favorable. At the lower temperature, a comparison of Example 2 with Examples 3 and 4 shows that in the absence of a zinc compound the yields are drastically lower (i.e. 31–32%) as compared with about 90% or more when a zinc compound is present.

Unexpectedly, it has been discovered that the catalytic activity of the zinc oxide and the zinc soaps with respect to the desired esterification reactions, is selective in its nature. While the desired esterification reaction is catalyzed, the undesired side reactions are affected by the presence of the catalyst to a significantly lesser extent. Thus, providing for the presence of zinc oxides and zinc soaps in the direct esterification reaction not only materially improves the reaction conditions, i.e., permits the use of shorter times and lower temperatures, but also provides a significant improvement in the yield of the desired ester product. The process thereby provides a novel method of obtaining esters of the hydroxy-sulfonates which is competitive with the more conventional acid chloride route and at the same time is more economical.

An important advantage of using the direct esterification reaction catalyzed by zinc oxide or zinc soap is that corrosion problems are substantially avoided. This is in sharp contrast to processes employing the acid chloride synthesis route, which are characterized by the presence of large amounts of acid chlorides and by-product hydrochloric acid, both of which are highly corrosive. Similarly, the reaction mass is quite corrosive where the direct esterification reaction is catalyzed by the presence of strong acids or salts of weak bases and strong acids. Such materials are disadvantageous in that the use of glass-lined equipment is required. The process of the present invention by contrast, uses neutral zinc oxide and zinc soaps which are themselves substantially non-corrosive. The equipment limitations, vis-a-vis corrosion, therefore, are imposed only to the extent that special materials of construction are required by the fatty acids. The fatty acids are substantially less corrosive, however, and therefore stainless steel equipment has been found to be satisfactory for carrying out the reaction according to the present invention.

It will be understood that the foregoing examples and explanation are for illustrative purposes and that the present invention includes numerous modifications which will be self-evident to those skilled in the art. Accordingly, the invention is not to be limited save as is consonant with the following claims.

We claim:
1. A method of preparing a compound of the formula RCOOR'SO$_3$M, wherein R is an aliphatic hydrocarbon having from 7 to 19 carbon atoms, R' is selected from the group consisting of divalent hydrocarbon radicals containing from 2 to 4 carbon atoms, and M is an alkali metal, the process comprising heating an acid of the formula RCOOH with a compound of the formula

HOR'SO$_3$M in the presence of a zinc compound selected from the group consisting of zinc oxides and soaps of zinc with an organic acid of the formula RCOOH at a temperature of about 200° to about 240° C., the ratio of RCOOH to HOR'SO$_3$M being at least about 1.2 moles per mole.

2. A method according to claim 1 wherein said zinc compound is present in an amount from about 0.05% to 5% calculated as ZnO based on the combined weight of hydroxy sulfonates, fatty acid and ZnO.

3. A method according to claim 1 wherein said zinc compound is present in an amount from about 0.1% to about 0.2% calculated as ZnO based on the weight of the reaction mixture.

4. A method of preparing a compound of the formula RCOOR'SO$_3$Na, wherein R is an aliphatic hydrocarbon radical having from 7 to 19 carbon atoms and R' is selected from the group consisting of divalent hydrocarbon radicals containing from 2 to 4 carbon atoms, comprising heating an acid of the formula RCOOH with a compound of the formula HOR'SO$_3$Na, in the presence of a zinc compound selected from the group consisting of zinc oxide and soaps of zinc with an organic acid of the formula RCOOH, at a temperature of about 200° to about 240° C., the ratio of RCOOH to HOR'SO$_3$Na being at least 1.2 moles per mole.

5. A method according to claim 4 wherein said R' is the ethylene radical.

6. A method according to claim 4 wherein the reactants are heated until water is no longer evolved from the reaction mixture.

References Cited by the Examiner

UNITED STATES PATENTS

| | | | |
|---|---|---|---|
| 1,873,513 | 8/1932 | Van Lood | 260—410.0 X |
| 1,993,552 | 3/1935 | Izard. | |
| 2,923,724 | 2/1960 | Anderson et al. | 260—400  |

CHARLES B. PARKER, *Primary Examiner.*

JOSEPH P. BRUST, *Examiner.*

ANTON H. SUTTO, *Assistant Examiner.*